S. TAKACS.
COMBINED SHEAR, PUNCH, AND BENDING MACHINE.
APPLICATION FILED APR. 22, 1909.
942,680.
Patented Dec. 7, 1909.
3 SHEETS—SHEET 1.
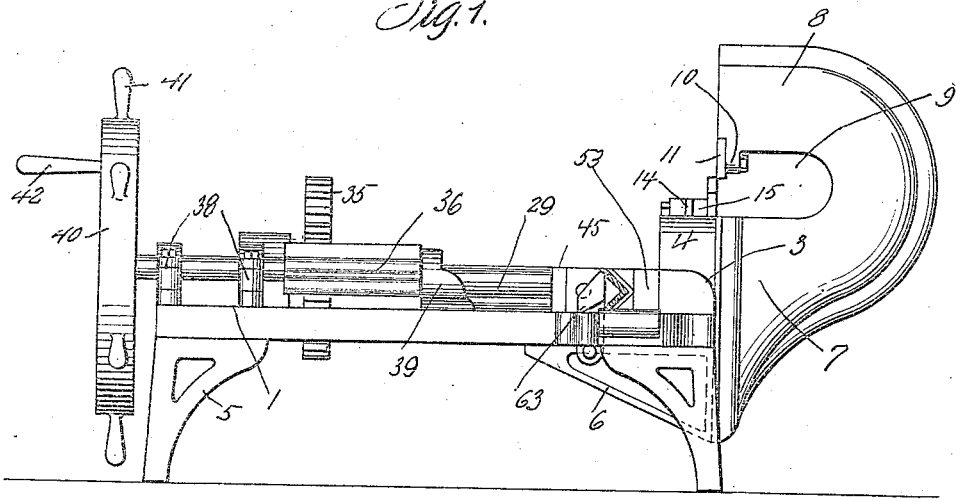
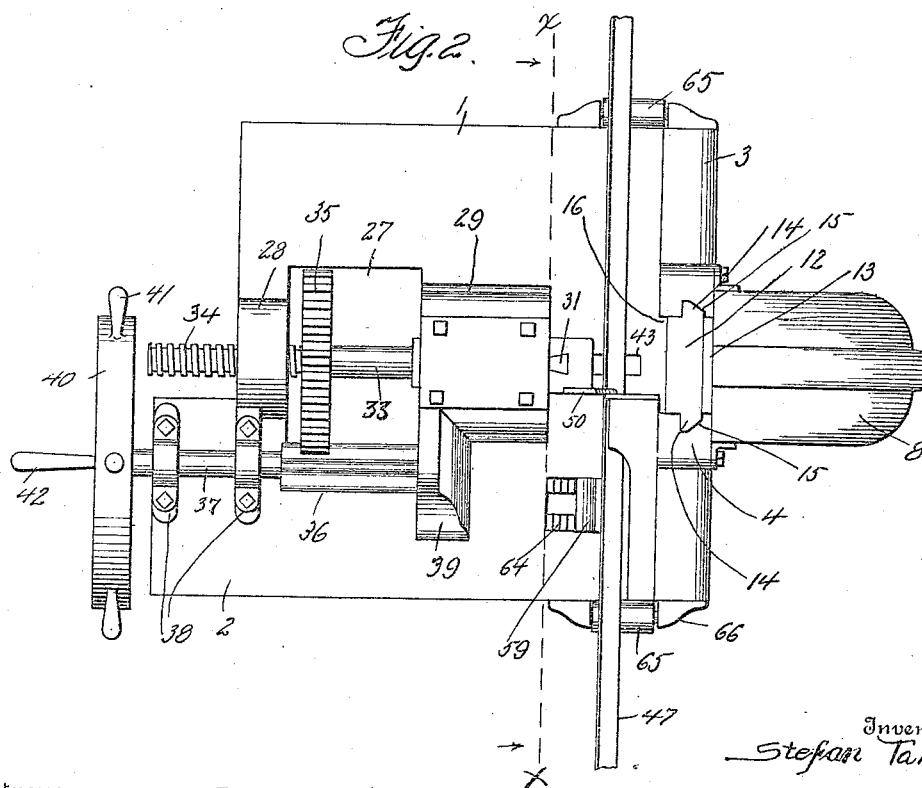

S. TAKACS.
COMBINED SHEAR, PUNCH, AND BENDING MACHINE.
APPLICATION FILED APR. 22, 1909.

942,680.

Patented Dec. 7, 1909.

Inventor
Stefan Takacs.

Witnesses

By
Attorneys

S. TAKACS.
COMBINED SHEAR, PUNCH, AND BENDING MACHINE.
APPLICATION FILED APR. 22, 1909.
942,680.
Patented Dec. 7, 1909.
3 SHEETS—SHEET 3.
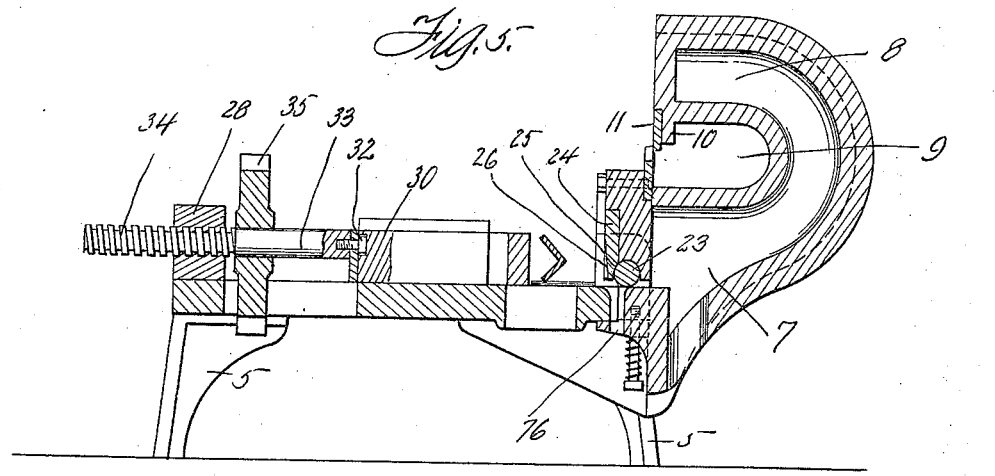
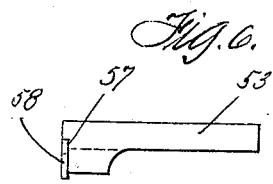
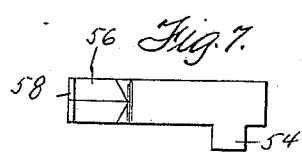
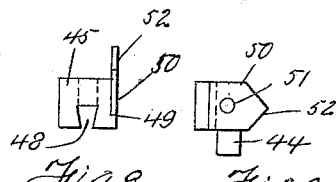
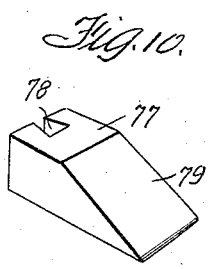
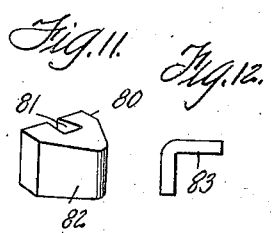
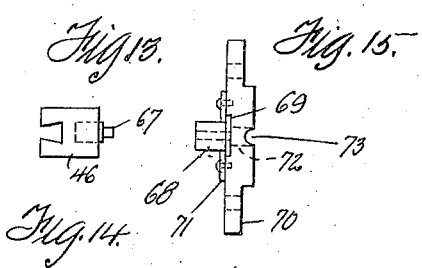
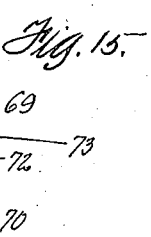
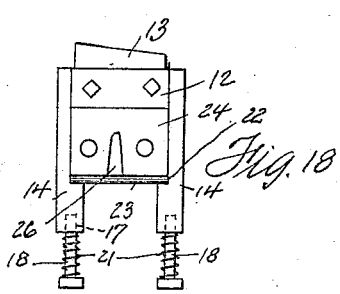
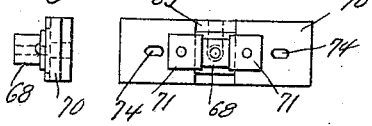
Witnesses
Samuel Payne
R. A. Butler
Inventor
Stefan Takacs.
By H. C. Everts Co.
Attorneys

UNITED STATES PATENT OFFICE.

STEFAN TAKACS, OF CHICAGO, ILLINOIS.

COMBINED SHEAR, PUNCH, AND BENDING MACHINE.

942,680.  Specification of Letters Patent.  Patented Dec. 7, 1909.

Application filed April 22, 1909. Serial No. 491,435.

*To all whom it may concern:*

Be it known that I, STEFAN TAKACS, a subject of the King of Hungary, residing at Chicago, in the county of Cook and State of Illinois, have invented certain new and useful Improvements in a Combined Shear, Punch, and Bending Machine, of which the following is a specification, reference being had therein to the accompanying drawing.

This invention relates to a combined punch, shear and bending machine, and the object of my invention is to provide a machine for expeditiously and economically shearing, punching and bending sheet metal bars and rods, thus avoiding the necessity of using separate machines to perform either operation.

Another object of the invention is to provide a machine of the above type with multiple dies, one of the dies being designed to operate the shearing mechanism of the machine, other dies for punching sheet metal or bars, and still other dies for bending rods and bars.

A still further object of the invention is to provide a compact machine that can be easily operated by hand or motive power to positively shear, punch or bend a piece of material.

With the above and other objects in view, which will more readily appear as the invention is better understood, the same consists in the novel construction combination and arrangement of parts to be presently described and then claimed.

Figure 3:
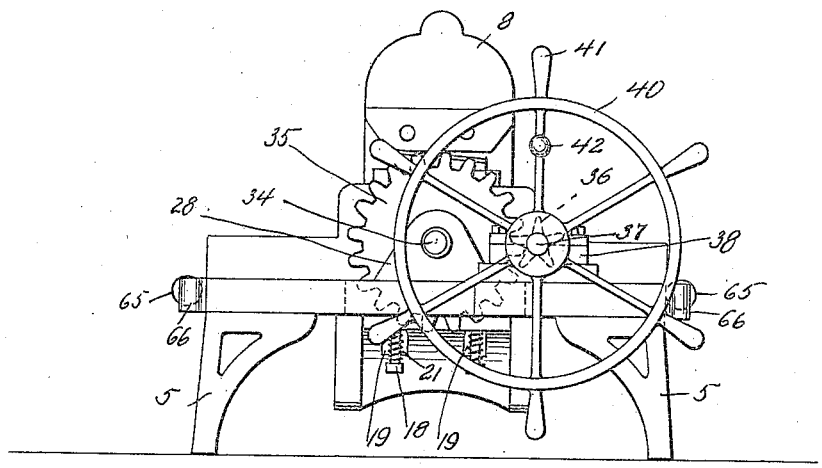
Figure 4:
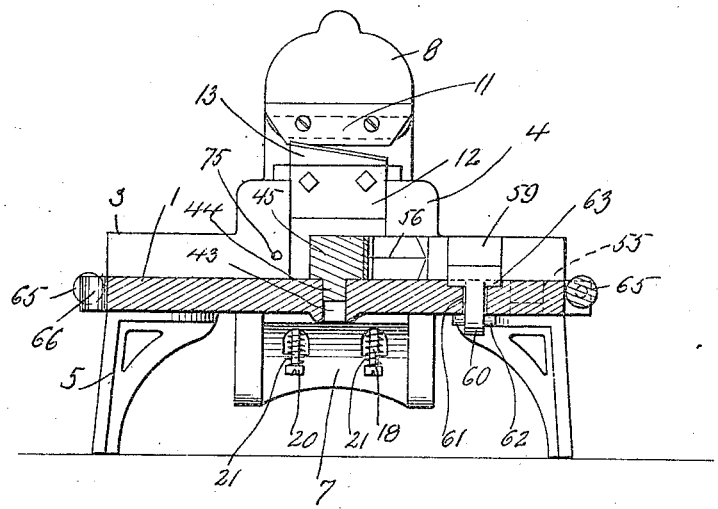

In the drawings, Figure 1 is a side elevation of the machine illustrating dies or attachments for cutting and shearing angle bars, Fig. 2 is a plan of the same, Fig. 3 is a front elevation of the machine, Fig. 4 is a cross sectional view of the machine taken on the line X—X of Fig. 2, Fig. 5 is a longitudinal sectional view of the machine, Fig. 6 is a plan of a detached bar cutting die, Fig. 7 is a side elevation of the same, Fig. 8 is a plan of a detached bar cutting die adapted to coöperate with the dies shown in Figs. 6 and 7, Fig. 9 is a side elevation of the same, Fig. 10 is a perspective view of a detached shear actuating head, Fig. 11 is a perspective view of the detached bending die, Fig. 12 is an end view of an attachment for the machine used during the bending operation, Fig. 13 is a plan of a detached male punching die, Fig. 14 is a side elevation of the same, Fig. 15 is a plan of a detached female punch die, Fig. 16 is an end view of the same, Fig. 17 is a front elevation of the female punch and die, Fig. 18 is a front elevation of a detached shearing member.

In the drawings, 1 designates a bed plate rectangular in plan, said plate having an extension 2 at the forward edge thereof, while the rear edge is provided with a vertical flange 3 having a central enlargement 4. The bed plate can be supported upon a suitable foundation or in an elevated position by legs or suitable supports 5.

6 designates brackets secured to the bottom of the bed plate 1, at the rear edge thereof, and fastened to said brackets, the flange 3 and the enlargement 4 of the bed plate 1 is a vertical shear body 7, having an overhanging jaw 8 providing a throat 9 adapted to receive material to be operated upon by the shearing mechanism of the machine. The jaw 8 is provided with a depending longitudinal flange 10 and detachably connected to said flange is a shearing knife or member 11.

12 designates a detachable shearing member having a detachable knife 13 adapted to coöperate with the knife 11 in shearing sheet metal. The detachable member 12 has the sides thereof provided with vertical guide ribs 14 adapted to slide in vertical grooves 15 provided therefor in the enlargement 4 of the flange 3, said enlargement being cut away, as at 16, to provide clearance for the member 12. The guide ribs 14 extend below the member 12, as best shown in Fig. 18 of the drawings, and are provided with threaded sockets 17 for screw bolts 18, said bolts extending upward through openings 19 provided therefor in the shear body 7. Encircling said screw bolts 18 between the shear body 7 and the heads 20 of said bolts are coil springs 21, these springs retaining the shearing member 12 within the enlargement 4 of the flange 3. The lower transverse edge of the member 12 is provided with a roller socket 22 for a revoluble roller 23, said roller being held in the socket by a plate 24 secured to the member 12, said plate having the inner lower edge thereof cut away, as at 25, to provide clearance for the roller 23, while the front lower edge of said plate is recessed, as at 26, to coöperate with a bending die that will be hereinafter considered.

The bed plate 1 is provided with an opening or well 27, and arranged at the forward edge of the opening 27 is a bearing 28, and at the rear edge thereof a guide housing 29. In the guide housing is slidably mounted a die holder 30 having the forward end thereof provided with a vertical dove-tailed tongue 31. Revolubly connected to the rear end of the die holder 30, as at 32, is a shaft 33 having the rear end thereof provided with screw threads 34 adapted to screw in the bearing 28.

35 designates a gear wheel mounted upon the shaft 33 adjacent to the screw threads 34, said gear wheel meshing with an elongated gear wheel 36 mounted upon a shaft 37, journaled in bearings 38 and 39, carried by the extension 2 and the plate 1. The shaft 37 extends beyond the extension 2 of the plate 1 and is provided with a large hand wheel 40 having peripheral handles 41 and a crank 42.

The bed plate 1 is provided with a longitudinal slot 43 over which the die holder is adapted to move and adapted to extend into said slot and be guided thereby are the depending lugs 44 of dies 45 and 46. The die 45 is used for cutting and shearing the bars, particularly an angle bar 47 placed upon the bed plate 1. This bar cutting die is provided with a vertical dove-tailed groove 48 to receive the tongue 31 of the die holder 30. The side of the cutting die 45 is recessed, as at 49, for a knife 50, which is secured to the die 45 by a screw 51. The knife 50 is pointed to provide tapering cutting edges, as at 52, to conform to the angle of the bar 47.

Coöperating with the die 45 is a die 53 having a depending lug 54 adapted to engage in a socket 55 provided therefor in the bed plate 1. The die 53 has the inner end thereof enlarged and provided with an angular recess 56 to receive and support the bar 47. The end of the die 53 is cut away, as at 57, for a detachable knife 58 having a V-shaped cutting edge to accommodate the bar 47. The knives 50 and 58 are adapted to coöperate in cutting the bar 47, and in order that said bar can be easily placed upon the bed plate 1 and firmly held, said bed plate is provided with certain devices to facilitate the operation of cutting the bar 47.

The first device is a clamping member 59 which is provided with a depending tongue 60 extending through a slot 61 provided therefor in the bed plate 1, the lower end of said tongue having a transverse pin 62 for normally retaining the clamping member in the bed plate 1. The clamping member is adjustably held by the rear edge 63 of said member, engaging ratchet teeth 64 provided therefor in the top surface of the bed plate 1 at each side of the slot 61. The other devices, are revoluble rollers 65, journaled in brackets 66 carried by the side edges of the bed plate 1 adjacent to the flange 3, said rollers being oppositely disposed whereby the bar 47 can be easily shifted over the bed plate 1, either for cutting or punching purposes, as will hereinafter appear.

The die 46 is used for punching bars or sheet metal, and besides having the depending lug 44, said die is provided with a detachable punch 67. This die is adapted to coöperate with a female punch 68 detachably mounted in a vertical groove 69 formed in a die block 70. The female die 68 is held in engagement with the block 70 by clamps 71, and said female die communicates with an opening 72 formed centrally of the block 70, and this opening communicates with a vertical groove 73, whereby slugs or material punched from a sheet or bar can be ejected from the machine. The block 70 is adapted to be attached to the flange 3 by screws or similar fastening means (not shown), adapted to extend through slots 74 formed in the block 70 and in the openings 75 formed in the flange 3. In order that the waste material after passing into the groove 73 can be discharged from the bed plate 1, said bed plate is provided with a vertical opening 76 with which the vertical groove 73 is adapted to register.

The reference numeral 77 designates a shear actuating head having the rear end thereof provided with a vertical dove-tailed groove 78 to receive the tongue 31 of the die holder 30. The forward end of the head 77 is beveled, as at 79 to ride under the roller 23 and elevate the shear member 12.

80 designates a bending die provided with a vertical dove-tailed groove 81 to receive the tongue 31 of the die holder 30. This bending die is provided with a tapering nose 82.

83 designates an angular member or attachment used during the bending operation of the machine, this attachment being shaped to rest upon the forward edges of the flanges 3 and brace a bar or rod that is being bent by the machine.

Operation: When the die holder 30 is moved toward the flange 3 through the medium of the shaft 33, screw threads 34, gear wheels 35 and 36 and the driven shaft 37, the die holder having attached thereto the shear actuating head 77 will elevate the knife 13 of the member 12 and coöperate with the knife 11 to shear a piece of sheet metal which is placed in the path of the knife 13. Assuming that the angle bar 47 has been placed in the position shown in Fig. 2 of the drawings and the die holder should be equipped with the die 45, and the bed plate 1 with the die 53, the bar 47 will be cut as the die holder 30 is moved forward. It will, of course, be understood that a rod or similar piece of metal can be cut by the dies 45 and 53, when the piece of metal is held against the die 53 by the clamp 59.

When it is desired to bend a bar or other material, the die 82 is attached to the die holder 30 and the angle-shaped member 83 placed in engagement with the flange 3, the material is positioned upon the bed plate 1, but the member 83 holds the material away from the flange 3 so that that portion of the material at one side of said member can be bent toward the plate 24 of the member 12 when the die 82 engages with the said portion.

In the shearing operation, the springs 21 beneath the bed plate 1 are adapted to retain the member 12 to its normal position as the shear actuating head passes from beneath the roller 23.

While in the drawings forming part of this application there is illustrated a machine designed for performing different kinds of work by the use of inter-exchangeable dies, I would have it understood that the structural elements entering into my invention can be varied or changed, as to the shape, proportion and manner of assemblage without departing from the spirit of the invention.

Having now described my invention, what I claim as new, is:—

1. In a punch, shear and bending machine, a bed plate, a shearing member connected to the rear edge of said bed plate, a shearing member movably supported relative to the first mentioned member and adapted to coöperate therewith, a die holder movably mounted upon said bed plate, a shear actuating head detachably connected to said holder and adapted to move under the last mentioned shear member for elevating the same, a bar cutting die adapted to be connected to said holder, a bar cutting die detachably mounted upon said bed plate and adapted to coöperate with the die of said holder for cutting a bar clamped against the last mentioned die, a die adapted to be connected to said holder for bending a bar placed upon said bed plate, and means for moving said die holder, said means including a screw, gear wheels for revolving said screw, and means for revolving said gear wheels.

2. A machine of the type described, comprising a bed plate, a shearing member connected to said bed plate, a shearing member movably supported by said plate and adapted to coöperate with the first mentioned member, a revoluble roller carried by said movable shearing member, a die holder movably mounted upon said bed plate, a head detachably connected to said holder and adapted to engage the roller of said movable shear member for elevating the same, means arranged beneath said bed plate for normally maintaining said movable shear member in a lowered position, a bar cutting die adapted to be detachably connected to said holder, a punching die adapted to be detachably connected to said holder, dies adapted to be detachably mounted upon said bed plate to coöperate with said bar cutting die and said punching die, means supported by said bed plate for moving said holder, and means supported by said bed plate for clamping a piece of work thereon.

3. A machine of the class described comprising a bed plate, a feed shaft connected thereto and provided with a screw-threaded end and further provided with a gear, a screw bearing for the screw-threaded portion of said shaft, a guide housing, a tool holder mounted in said guide housing and having one end provided with means for attaching a tool thereto and having its other end connected to said shaft, whereby said holder will be shifted simultaneously with the longitudinal movement of the shaft, an operating shaft journaled to said bed plate, means for rotating said shaft and an elongated gear wheel carried by the operating shaft and meshing with the first-mentioned gear wheel for driving the same during the longitudinal movement of the feed shaft.

In testimony whereof I affix my signature in the presence of two witnesses.

STEFAN TAKACS.

Witnesses:
  VINCENT P. MARELLA,
  WM. KEMPF.